Figure 1:
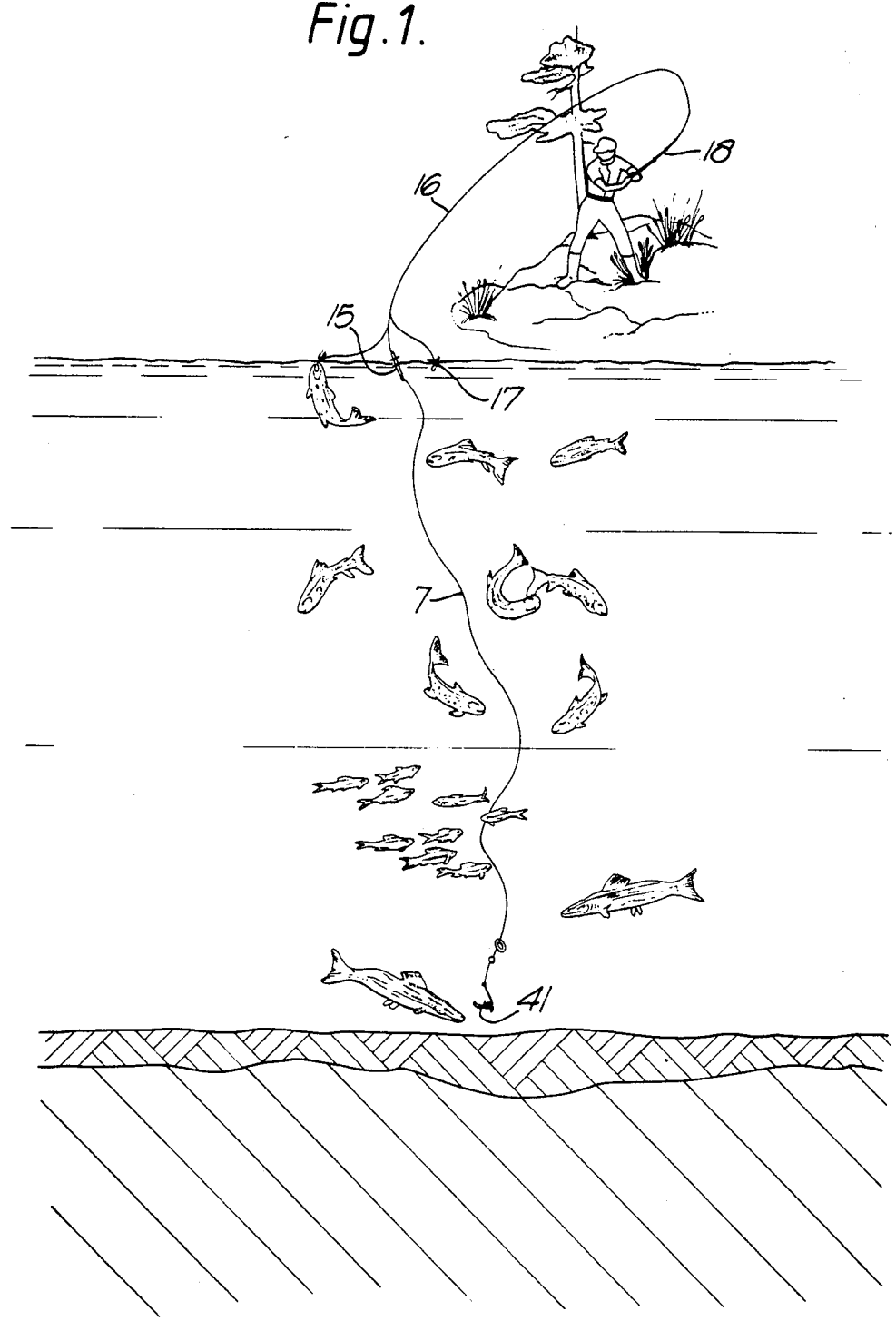

United States Patent [19]

Nyman

[11] Patent Number: 4,571,878
[45] Date of Patent: Feb. 25, 1986

[54] FISHING TACKLE INCLUDING LINE RELEASING FLOAT

[76] Inventor: Sigurd P. Nyman, Pl 3310, Loffstrand, S-680 50 Ekshärad, Sweden

[21] Appl. No.: 560,875

[22] Filed: Dec. 13, 1983

[51] Int. Cl.⁴ ............................................. A01K 93/00
[52] U.S. Cl. .................................. 43/43.11; 43/44.92; 43/44.93
[58] Field of Search .................... 43/4, 43.11, 15, 16, 43/44.92, 44.93, 44.94, 44.98, 43.12, 42.1

[56] References Cited

U.S. PATENT DOCUMENTS

| | | | |
|---|---|---|---|
| 2,712,197 | 9/1948 | Lewis | 43/41.2 |
| 2,888,771 | 12/1951 | Stephens | 43/43.11 |
| 3,144,729 | 8/1964 | Jonassen | 43/43.11 |
| 3,352,050 | 11/1967 | Mowrey | 43/43.11 |
| 3,375,603 | 4/1968 | Loghry | 43/43.11 |

Primary Examiner—Nicholas P. Godici
Assistant Examiner—Chris McKee
Attorney, Agent, or Firm—Murray, Whisenhunt and Ferguson

[57] ABSTRACT

Fishing tackle including a casting float comprising two members. The first member constitutes a bobber portion. The second constitute a line storage drum. The two members are telescopically moveable relative to each other. During casting the relative movement actuates the release of fishing line from the line storage drum, prior to the float hitting the water.

9 Claims, 3 Drawing Figures

FISHING TACKLE INCLUDING LINE RELEASING FLOAT

This invention relates to fishing tackle and more particularly to a casting float intended to be used in combination with a conventional reel and casting rod for sport fishing in still or slowly streaming water.

The main purpose of the invention is to make it possible to catch fishes by means of a sinking bait as well as baits floating on the water surface, so called dry flies. According to the invention the two fishing methods can be employed at the same time or alternatively.

In conventional dry fly fishing there is required a special equipment and it is also necessary that the sport fisher possesses a considerable skill. Further there is required a large free space behind the fly fisher. It is also known in the art to use casting floats in order to facilitate the fly fishing technique. It has also been proposed to use casting floats for fishing with sinking baits, but these known floats only permit fishing to a depth of up to 1.5-2 m. If the sinking line is longer, it is difficult to avoid tangle. When fishing with conventional floats and fishing rods, it is of course possible to achieve greater fishing depths, but in that case a much smaller area can be reached by the fisher.

It is an object of the present invention to solve the above problems. This can be achieved therein that the fishing tackle of the invention includes a casting float comprising two members, namely a first member which is a buoyant bobber, and a second member comprising a line drum for a sinking line, the fishing tackle further comprising locking means for securing the sinking line to the drum during at least the initial part of the cast but releasing the sinking line prior to the float hitting the water surface.

Further objectives and characteristics features of the invention will be apparent from the appending claims and from the following description of a preferred embodiment.

Figure 2:
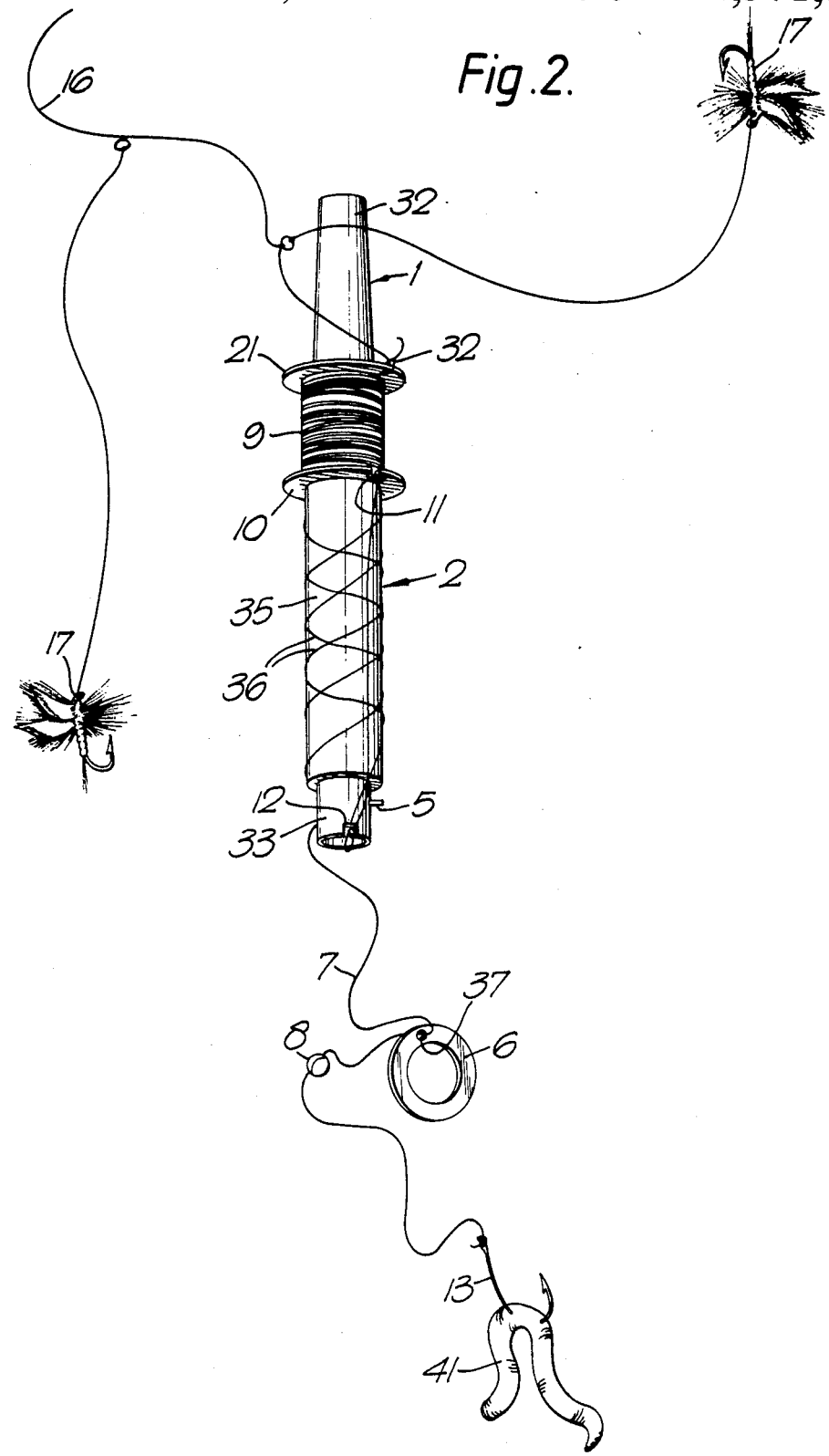
Figure 3:
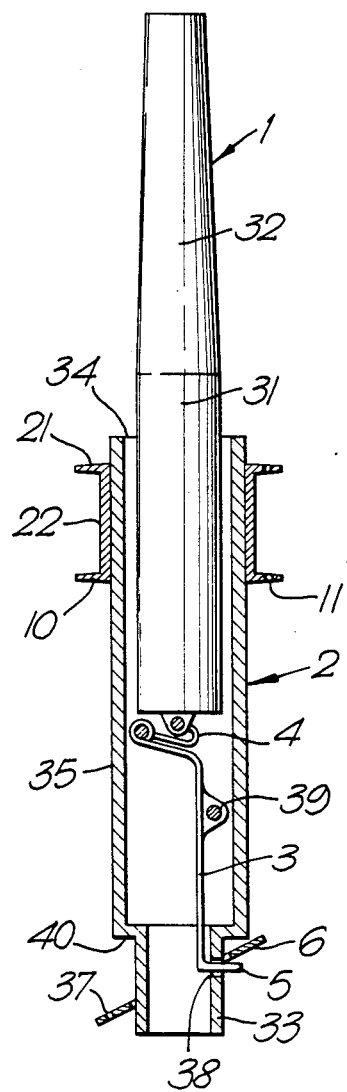

In the following description of a preferred embodiment reference will be made to the accompanying drawings, in which FIG. 1 is a perspective view illustrating how the fishing tackle of the invention can be used;

FIG. 2 shows the fishing tackle according to a perferred embodiment of the invention; and FIG. 3 shows a casting float partly in section.

With reference first to FIG. 1 a casting float is generally designated 15. A fishing line is designated 16, a fishing rod 18 and a sinking line 7. On the fishing line 16, which is attached to an upper flange 21 of the casting float by a knot 30, there is attached a number of dry flies 17 adjacent to the casting float 15.

The casting float 15 consists of two members 1 and 2, which are telescopically moveable. The first member 1 is a bobber having a cylindrical bottom portion 31 and a conically tapered upper portion 32, and the second member 2 is a sleeve, which is substantially cylindrical. Also the lower end portion 33 of said second member 2 is cylindrical but has a smaller diameter. The annular space or play between the cylindrical sleeve 2 and the cylindrical bottom portion of the bobber 1 is designated 34.

The cylindrical member 2 is preferably made from a non-buoyant material but is kept afloat immediately below the water surface by the buoyant bobber 1, the conical part 32 of which is visible above the water surface in a manner which is conventional.

The cylindrical sleeve or second member 2 has in its upper part a drum 22 with two exterior flanges 21 and 10. On the drum 22 there is a storage 9 of sinking line. The sinking line is fastened in a first labyrinth slot 11 in the lower flange 10 and in a second slot 12 in the lower end of the cylindrical member 2. The main part of the sleeve 2 forms a drum 35 for a length of sinking line adapted to the desired depth of fishing at lower depths by means of a bait 41 on a hook 13 attached to the end of the sinking line 7. A lead sink is designated 8.

From the storage 36 of sinking line on the drum 35 the line runs freely through an aperture 37 in the annulus of a washer-shaped ring 6 on the lower end portion 33 of said second member 2. During the initial stage of the cast the ring 6 is retained on said lower part 33 by means of a finger 5 extending through an aperture 38 in said bottom portion 33. The finger 5, which consists of a bent piece of metal wire, is the projecting part of a lever 3, which is pivotable about a pivot 39. Also the opposite arm of the lever 3 is bent and connected to the lower end of the bobber 1 by means of a short string 4.

Before casting, the fisherman winds up the sinking line 7 on the drum 35, starting at the lower slot 12 and continuing until the lead sink 8 will abut the washer ring 6 which then is mounted on the lower end portion 33 and secured by the retainer pin 5. The tangle is now prepared for casting.

During the first part of the cast, when the trajectory of the casting float is inclined upwards, the bobber 1 will move telescopically backwards in the sleeve member 2 because of its inertia and the attraction of gravity, such that the string 4 will be stretched and rotate the lever 3 about the pivot 39. As a result the retention finger 5 will be drawn completely into the interior of the bottom part 33 such that the locking ring 6 is released. However, the locking ring 6 during this phase of the cast will remain on said bottom part 33, and as a matter of fact it will be pressed against the lower edge 40 of the main part of said second member 2 by the air drag. Eventually, the gravitation force attracting the ring 6 and the air drag acting upon the ring 6 will be substantially balanced. However, the ring 6 shall leave the float 15 before the float hits the water surface in order to avoid too much splashing. Therefore the weight of the ring 6 shall be related to the area of the ring, in other words the ratio weight/area shall be such that the washer-shaped ring 6 certainly will leave the casting float 15 before the casting float reaches the water surface. Therefore once the ring 6 has left the casting float 15 the line storage 36 on the lower drum portion 35 will start unwinding. When the casting float 15 hits the water surface, the unwinding of the line from the lower drum 35 will continue. The lead sink 8 and the washer ring 6 will bring the sinking line 7 to the desired depth, which usually is at a distance above the bottom of the lake or the river. However, if the hook 13 and the bait 41 as well as the ring 6 would reach the bottom, the line 7 may run freely through the aperture 37 in the annulus of the ring 6 even if the ring would fasten in the bottom vegetation.

I claim:

1. Fishing tackle including a casting float comprising a first member comprising a bobber and a second member comprising a first line drum for a sinking line and a second line drum for line storage, said second line drum disposed above said first line drum; said first and second members telescopically moveable relative to one another; the fishing tackle further comprising locking means for securing the sinking line to said first line drum during at least the initial part of a cast but releasing the sinking line prior to the float hitting the water surface, said locking means provided on said second member beneath said first drum.

2. Fishing tackle according to claim 1, wherein said locking means is a ring around the lower end portion of said second member, and wherein there are retainer means for retaining the ring to the second member during at least the initial stage of the cast, and disengaging means for withdrawing said retainer means by a telescopical movement of said first and second members.

3. Fishing tackle according to claim 2, wherein the retainer means is part of a lever mechanism between said first and second members.

4. Fishing tackle according to claim 2, wherein the sinking line is led through an aperture in the annulus of the ring such that the sinking line when sinking may run freely through said aperture.

5. Fishing tackle according to claim 1, wherein said first member has a cylindrical bottom portion and said second member has a cylindrical upper sleeve portion encasing the cylindrical bottom portion of said first member.

6. Fishing tackle according to claim 5, wherein there is an annular space between said cylindrical bottom portion and said cylindrical upper sleeve portion.

7. Fishing tackle according to claim 2, wherein the weight/area ratio of the ring is such that the ring will leave the casting float prior to the casting float hitting the water surface.

8. Fishing tackle according to claim 2, wherein the lower end portion of said second member has a smaller diameter than the main portion of said member, said ring initially arranged on said lower end portion and secured to it by said retainer means projecting through an aperture in the wall of said lower end portion.

9. Fishing tackle including a casting float comprising a bobber and a second member comprising a line drum for a sinking line, said second member made of a non-buoyant material but kept afloat by the buoyant bobber immediately below the water surface; the fishing tackle further comprising locking means for securing the sinking line to said line drum during at least the initial part of a cast but releasing the sinkin line prior to the float hitting the water surface.

* * * * *